United States Patent Office 3,209,426
Patented Oct. 5, 1965

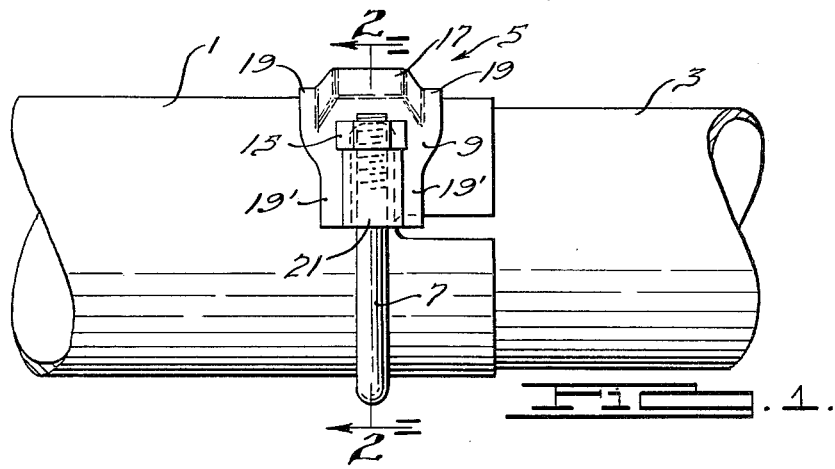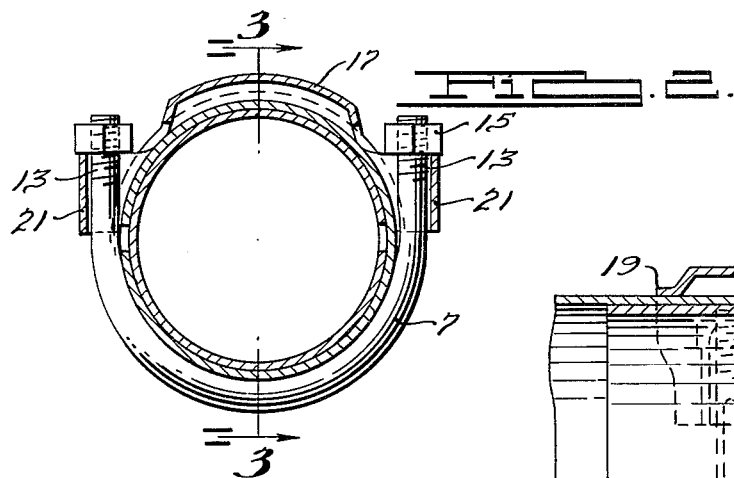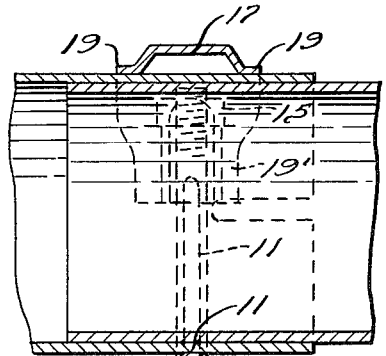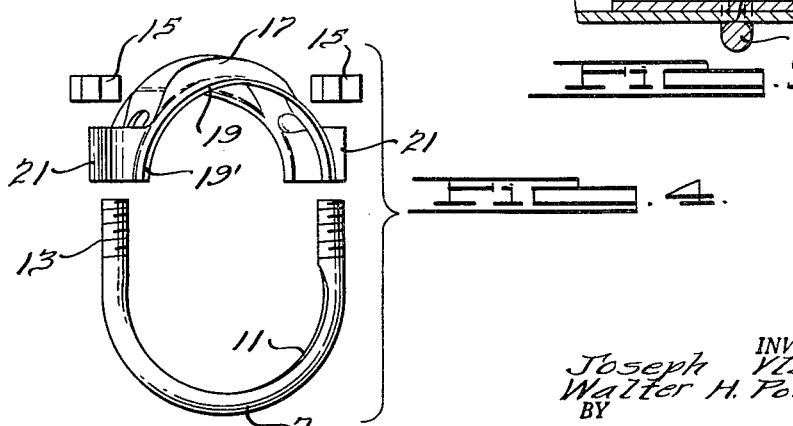
INVENTORS.
Joseph Vlasak,
Walter H. Powers.
BY
ATTORNEYS.

3,209,426
CLAMP
Joseph J. Vlasak and Walter H. Powers, Racine, Wis., assignors to Walker Manufacturing Company, a corporation of Delaware
Continuation of application Ser. No. 55,011, Sept. 9, 1960. This application Jan. 29, 1964, Ser. No. 341,083
1 Claim. (Cl. 24—277)

This invention relates to clamps such as those used to connect mufflers to pipes. This application is a continuation of our application Serial No. 55,011, filed September 9, 1960, and now abandoned.

It is an object of the invention to provide a clamp strumcture which produces a relatively low unit pressure on the parts being clamped together.

Another object is to provide a clamp structure having an optimum stress distribution.

A further object is to provide a clamp structure giving more uniform sealing but less serious deformation of the parts being clamped together and which conforms to the shape of the parts being clamped.

The above and other objects are achieved by means of a structure in which a saddle is formed by a progressive die from a flat metal blank into a semi-circular shape containing a centrally located, box-shaped rib and a pair of semi-circular arches at opposite ends which internally receive the ends of a flattened, semi-circular U-bolt. The ends of the U-bolt are threaded to receive nuts which bear on the tops of the arches to serve as means for drawing the saddle and U-bolt tightly together to clamp parts extending through them.

The invention is illustrated in its presently preferred form in the accompanying drawings in which:

FIGURE 1 is a side elevation of the clamp shown in position to clamp a muffler inlet or outlet bushing to an exhaust or tailpipe of an automobile;

FIGURE 2 is a section taken along the line 2—2 of FIGURE 1;

FIGURE 3 is a section taken along the line 3—3 of FIGURE 2; and

FIGURE 4 is an exploded perspective view of the clamp.

In the drawings, the numeral 1 indicates the notched inlet or outlet bushing of a muffler and the numeral 3 indicates an exhaust pipe or tail pipe to which it is desired to clamp the member 1 in a sealed connection by means of the present clamp structure 5.

The clamp 5 comprises two parts, a U-bolt 7 and a saddle 9. The bolt 7 is originally of round cross section but its semi-circular inside pipe engaging surface is flattened as seen at 11 to reduce unit stresses on the outside of bushing 1. The ends of the bolt 7 are circular and threaded as seen at 13 to receive nuts 15.

The saddle 9 is formed in a three stage progressive die into a semi-circular shape as can be seen in FIGURES 1, 2 and 3. Along the central half of its circumference extends a raised, box-shaped section 17 of tapered sides which is flanked by pipe contacting sections 19. The two end portions of the saddle subtend arcs of about 45 degrees and are of identical construction. In them the pipe contacting surfaces 19 continue as seen at 19' but are drawn inwardly toward each other so that metal is provided for the two parallel, semi-circular, bolt receiving arches 21 which are, of course, open at both the top and bottom and have flat edge surfaces on the top and bottom. Since the ends of box section 17 taper into the two end-arch section, contact with the pipe 1 is provided only by the outside peripheral sections of the clamp 19 and 19', the central portion of the clamp being raised to a greater or lesser extent throughout the entire circumference of the saddle. Nevertheless, the sections 19 and 19' provide a large enough contact area, approximately equal to that of the flattened section 11 on the U-bolt, to reduce unit stresses to the point where they are not likely to "brinell" or do harm to the surface or surface coating of pipe 1 and to provide relatively uniform stressing throughout the entire area being clamped.

As is evident, the two parts 7 and 9 of the clamps are separable and clamping is accomplished by inserting the ends of the U-bolt through the arches 21 and tightening nuts 15 which bear on the top edges of the arches. The saddle is somewhat conformable, particularly at the ends of the box section 17, to the pipe surface but the box section 17 and arches 21 also provide stiffness and strength where they are needed. The parts 7 and 9 are of approximately equal strength, as well as contact area, and thus will yield about the same time under load.

What is claimed is:

A pipe clamp comprising a saddle, a U-bolt, and nuts for attachment to the ends of the U-bolt to clamp it and the saddle to a circular pipe, said saddle being formed of a single piece of metal and substantially semicircular in configuration and curved substantially about the axis of a pipe to be clamped, said saddle being formed by pressing from a piece of flat metal of uniform thickness, said saddle having an inner wall providing an inside circumferentially extending pipe engaging surface located on an inner diameter, said saddle having a box section pressed outwardly in said inner wall from said surface and located in a central circumferential position on said saddle, said box section including end walls at opposite circumferential ends of the box section which extend in an axial direction and inwardly to said inner wall, said box section including side walls at opposite axial sides which extend in a circumferential direction and inwardly to said inner wall, said box section including an outer wall of larger diameter than said inner wall and extending circumferentially of said saddle between said end walls and said side walls, said inner wall including band sections that extend along the entire circumferential length of said saddle and pass on opposite sides of said box section and which are substantially wider in a direction parallel to the pipe axis than the wall thickness of said metal, said saddle having at each circumferential end thereof a curved wall section shaped to provide an aperture to receive an end of said U-bolt, each said aperture extending substantially parallel to a radius drawn from said pipe axis to the midpoint of said box section, the tops of said curved wall sections being on the box section ends of the curved wall sections and lying in planes that are substantially parallel to said pipe axis, said tops providing seating surfaces for said nuts, said band sections adjacent the circumferential ends of said saddle being drawn together to provide metal for said curved wall sections, said U-bolt being threaded at opposite ends and said ends extending through said apertures in said curved wall sections, said U-bolt having a flat circumferentially extending inner pipe engaging face, the saddle and U-bolt having strengths and pipe engaging areas such as to apply approximately equal and uniformly distributed loads to opposite sides of a pipe being clamped.

References Cited by the Examiner
UNITED STATES PATENTS

| | | | |
|---|---|---|---|
| 720,296 | 2/03 | Straub | 24—277 |
| 1,882,305 | 10/32 | Stupar et al. | |
| 2,074,799 | 3/37 | Merrill | 138—99 |
| 2,709,094 | 5/55 | Polanski | 285—407 |
| 2,834,087 | 5/58 | Herman | 24—279 |
| 2,959,834 | 11/60 | Graham | 24—277 |
| 2,985,934 | 5/61 | Daubner | 24—277 |

DONLEY J. STOCKING, *Primary Examiner.*